(12) United States Patent
Costello et al.

US007787633B2

(10) Patent No.: US 7,787,633 B2
(45) Date of Patent: Aug. 31, 2010

(54) CROSSFADE SAMPLE PLAYBACK ENGINE WITH DIGITAL SIGNAL PROCESSING FOR VEHICLE ENGINE SOUND SIMULATOR

(75) Inventors: Sean M. Costello, Olympia, WA (US); Timothy S. Stilson, Mountain View, CA (US)

(73) Assignee: Analog Devices, Inc., Norwood, MA (US)

( * ) Notice: Subject to any disclaimer, the term of this patent is extended or adjusted under 35 U.S.C. 154(b) by 1620 days.

(21) Appl. No.: 11/040,319

(22) Filed: Jan. 20, 2005

(65) Prior Publication Data

US 2006/0177797 A1 Aug. 10, 2006

(51) Int. Cl.
*H03G 3/00* (2006.01)
*H04B 1/00* (2006.01)

(52) U.S. Cl. .................. 381/61; 381/86; 340/384.3

(58) Field of Classification Search ................ 446/409; 434/29; 704/270; 381/61, 86; 700/94; 340/384.3, 340/384.7–384.73
See application file for complete search history.

(56) References Cited

U.S. PATENT DOCUMENTS

| | | | | | |
|---|---|---|---|---|---|
| 4,325,199 | A | * | 4/1982 | McEdwards | ................. 446/130 |
| 5,237,617 | A | * | 8/1993 | Miller | ........................... 381/61 |
| 5,586,187 | A | * | 12/1996 | Webb | ........................... 381/61 |
| 5,635,903 | A | * | 6/1997 | Koike et al. | .................. 340/441 |
| 5,835,605 | A | * | 11/1998 | Kunimoto | ..................... 381/61 |
| 6,275,590 | B1 | * | 8/2001 | Prus | ............................. 381/61 |
| 6,725,150 | B1 | * | 4/2004 | Glandian | ..................... 701/115 |
| 6,959,094 | B1 | * | 10/2005 | Cascone et al. | ............... 381/86 |
| 7,164,894 | B2 | * | 1/2007 | Nagahama et al. | ........ 455/168.1 |
| 7,606,374 | B2 | * | 10/2009 | Maeda | ......................... 381/61 |
| 7,650,001 | B2 | * | 1/2010 | Yasushi et al. | ................. 381/61 |
| 2005/0169484 | A1 | * | 8/2005 | Cascone et al. | ............... 381/61 |

* cited by examiner

*Primary Examiner*—Xu Mei
(74) *Attorney, Agent, or Firm*—Koppel, Patrick, Heybl & Dawson

(57) ABSTRACT

A vehicle engine sound simulator includes a crossfade sample playback engine which produces an output waveform comprising at least two constituent waveforms which are transposed up and down in frequency with RPM. The playback engine's output waveform is provided to at least one digital signal processing (DSP) circuit, which processes the output with a function that varies with the rate of change of RPM, an external load value, and/or a combination of both to produce the simulator's output. The crossfade sample playback engine is arranged to crossfade between at least 2 wave samples as RPM changes. Wave samples from additional wave banks associated with different load states can also be mixed into the playback engine's output waveform. The DSP circuit can include both nonlinear and linear processing sections in various combinations.

35 Claims, 7 Drawing Sheets

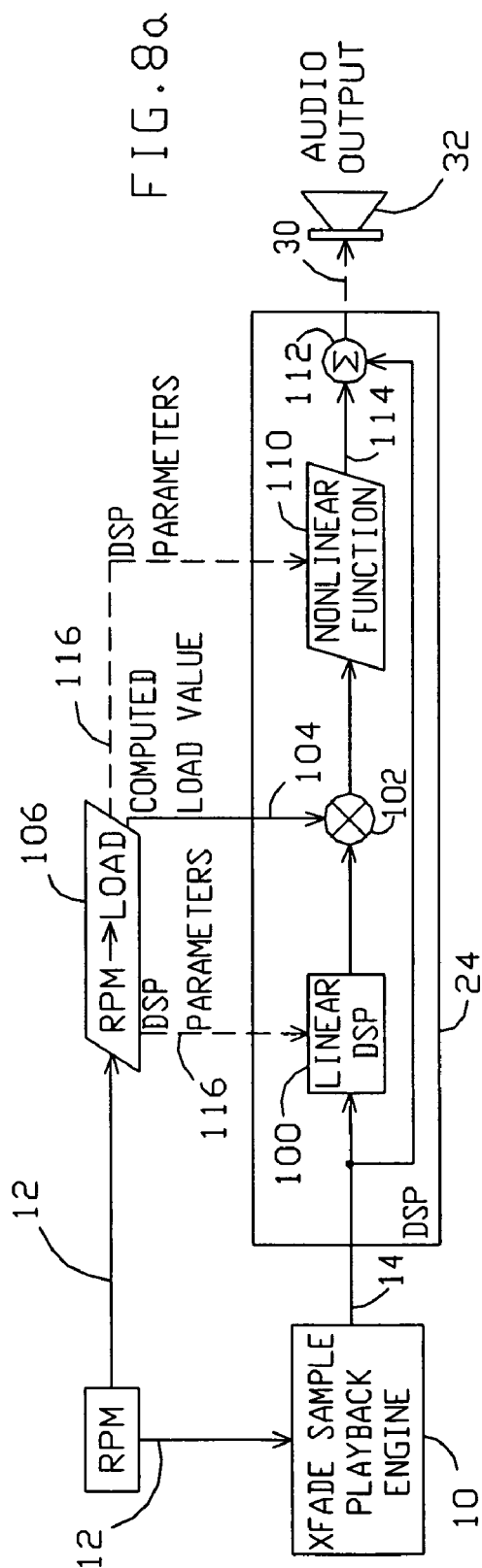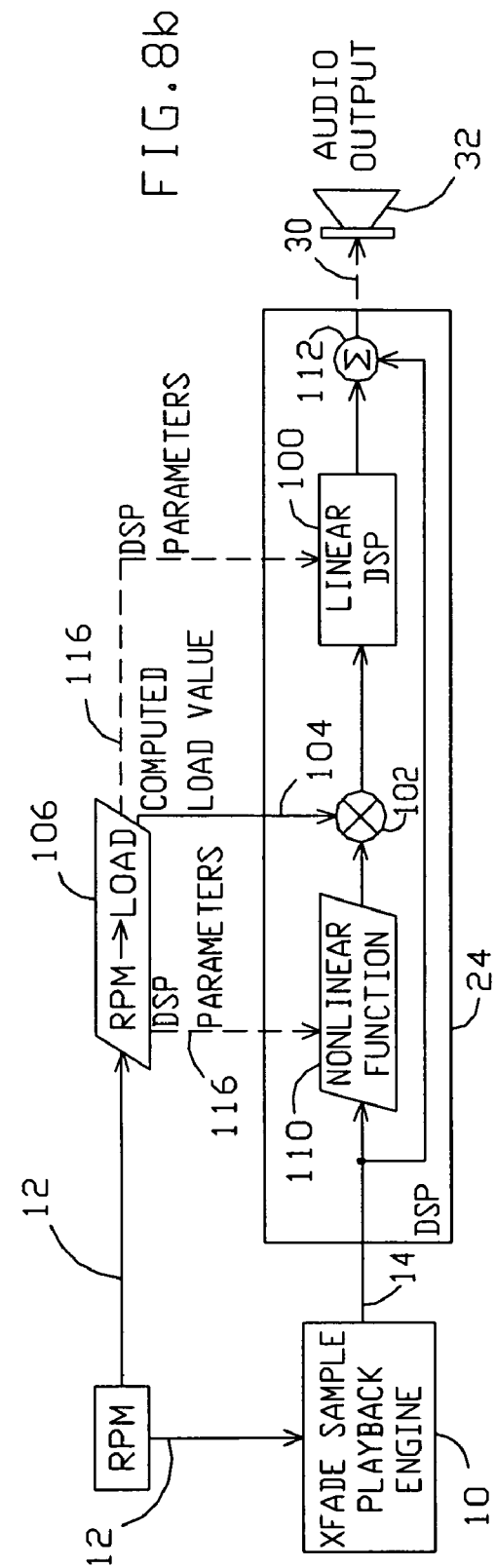

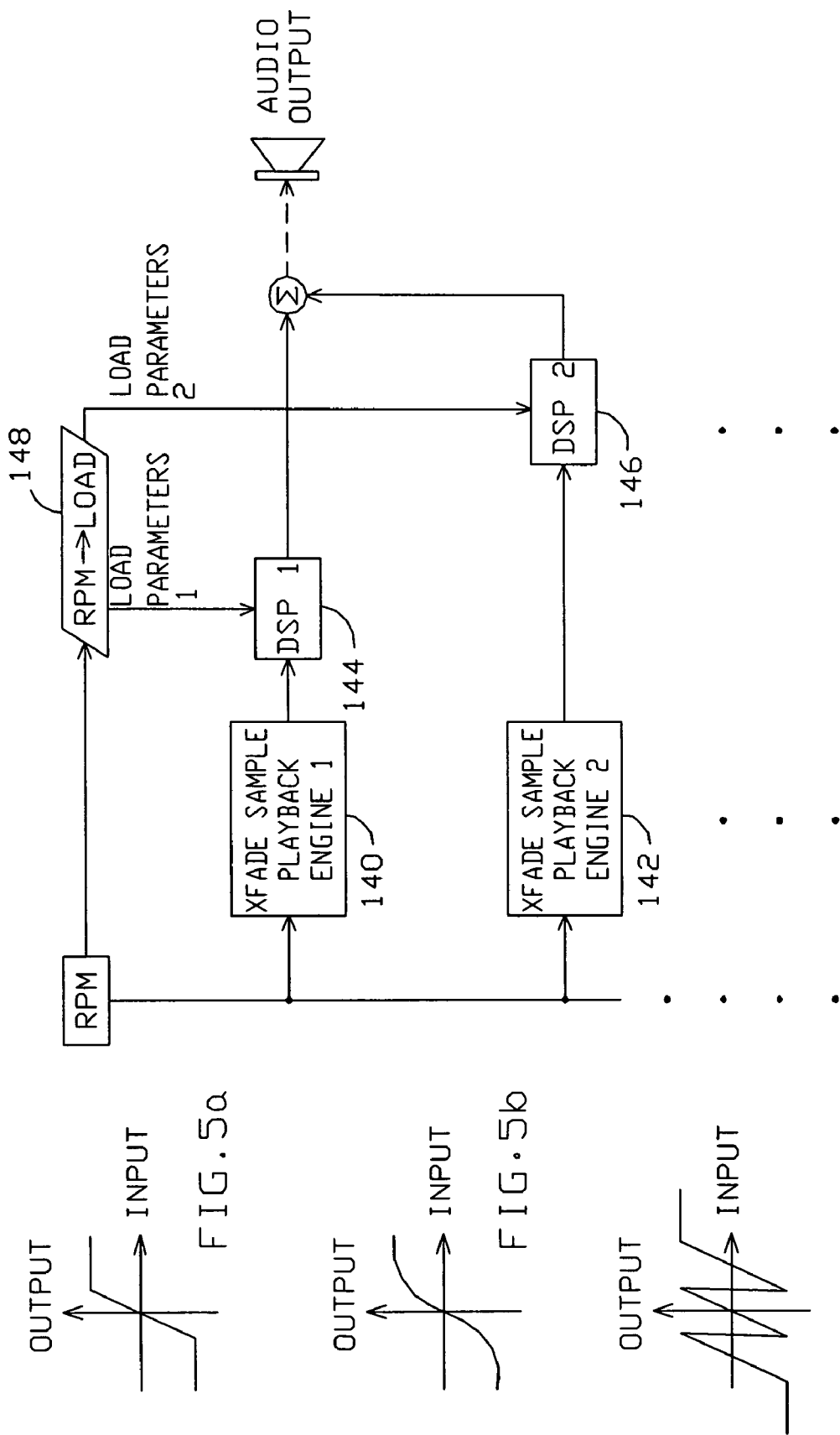

CROSSFADE SAMPLE PLAYBACK ENGINE WITH DIGITAL SIGNAL PROCESSING FOR VEHICLE ENGINE SOUND SIMULATOR

BACKGROUND OF THE INVENTION

1. Field of the Invention

This invention relates to the field of sound simulators, and particularly to sound simulators for the generation of engine sounds with load effects.

2. Description of the Related Art

Modern-day virtual reality simulators, such as video and computer games, often require realistic vehicle engine sounds to accompany the action being displayed. Various techniques have been used to provide such sounds.

One method used to simulate vehicle engine sounds relies on the playback of looped sound waves, where the pitch of the waves varies according to the simulated RPM or speed of the vehicle.

This approach neglects several important aspects that are found in the engine sounds of actual vehicles. For example, such looped sample-based solutions lack variation according to load. Most vehicles have an engine that must perform more work when accelerating, which alters the texture of the engine sound. Recordings taken of steady-state vehicle sounds are unable to capture the variations in load that are associated with acceleration and deceleration.

Another problem with prior art efforts is the unnatural shifting of formants. Formants are a characteristic set of peaks in the frequency response of an object's sound, associated with resonances within the physical system. For most vehicles, there is a fixed set of formants that is independent of the speed of the vehicle or the RPM of the engine. When a sound sample is taken of a vehicle, the formants in the sample are only accurate when the sample is played back at the pitch at which it was recorded. As prior art methods of vehicle sound simulation pitch the sample up and down, the result is a sound that has formants which shift up and down, resulting in an unnatural sound.

SUMMARY OF THE INVENTION

A vehicle engine sound simulator is presented which overcomes the problems noted above, providing a more natural sound which varies with engine load.

The present vehicle engine sound simulator includes a crossfade sample playback engine which produces an output waveform comprising at least two constituent waveforms which are transposed up and down in frequency with RPM; the constituent waveforms are mixed together, with the proportions of each constituent waveform varying with the RPM of a vehicle engine. The simulator also requires at least one digital signal processing (DSP) circuit which receives the output waveform from the crossfade sample playback engine, and processes the output with a function that varies with a computed load value to produce the simulator's output.

The crossfade sample playback engine is arranged to crossfade between at least 2 wave samples as RPM changes. Wave samples from additional wave banks associated with different load states can also be mixed into the playback engine's output waveform. The DSP circuit can include both nonlinear and linear processing sections in various combinations, at least some of which are arranged to vary as a function of the computed load value.

Further features and advantages of the invention will be apparent to those skilled in the art from the following detailed description, taken together with the accompanying drawings.

BRIEF DESCRIPTION OF THE DRAWINGS

FIGS. 5$a$-5$c$ are graphs representing possible nonlinear functions that could be used with a vehicle engine sound simulator per the present invention.

FIG. 7$b$ is a block diagram illustrating another possible embodiment of a vehicle engine sound simulator per the present invention which employs a linear DSP.

FIG. 7$c$ is a block diagram illustrating another possible embodiment of a vehicle engine sound simulator per the present invention which employs a linear DSP.

FIG. 8$a$ is a block diagram illustrating one possible embodiment of a vehicle engine sound simulator per the present invention which employs a nonlinear function circuit and a linear DSP.

FIG. 8$b$ is a block diagram illustrating another possible embodiment of a vehicle engine sound simulator per the present invention which employs a nonlinear function circuit and a linear DSP.

FIG. 10 is a block diagram illustrating another possible embodiment of a vehicle engine sound simulator per the present invention.

DETAILED DESCRIPTION OF THE INVENTION

Figure 1:
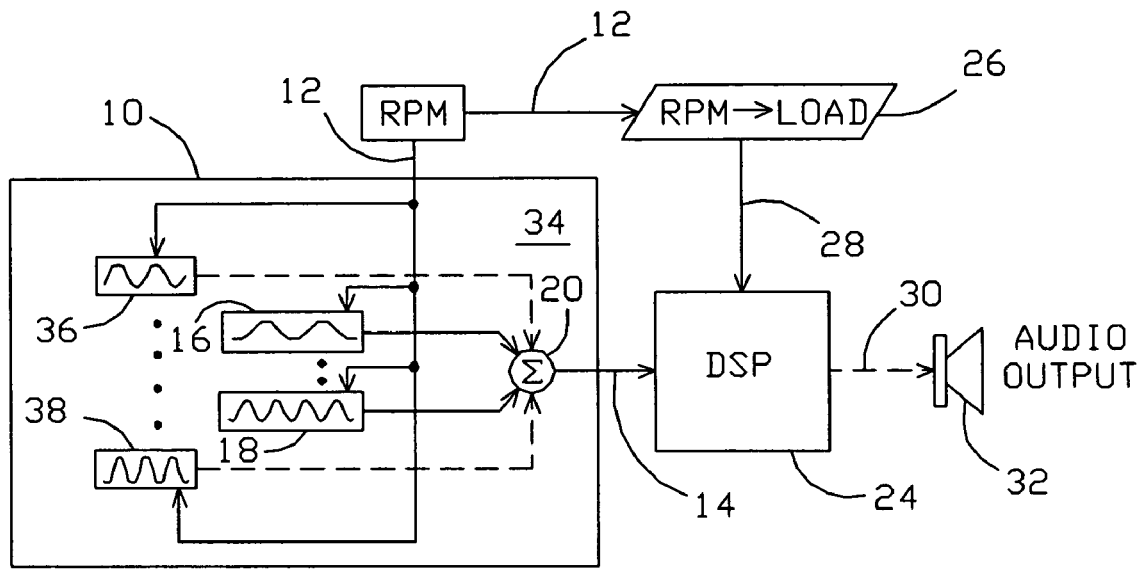
FIG. 1 is a block diagram illustrating the basic principles of the invention.

A block diagram illustrating the principles of a vehicle engine sound simulator in accordance with the invention is shown in FIG. 1. A crossfade simulator playback engine 10 receives a signal 12 representative of engine RPM at an input, and produces an output waveform 14 which varies with RPM. Playback engine 10 contains a number of stored digital waveforms, each of which is transposed up and down in frequency as a function of RPM; two such waveforms, 16 and 18, are shown in the exemplary playback engine shown in FIG. 1. The waveforms are typically complex, but could be sinusoids as well. Output waveform 14 comprises a mix of at least two of the stored waveforms, which are crossfaded between as a function of RPM; this is symbolized in FIG. 1 with a summing circuit 20.

Output waveform 14 is processed by a DSP circuit 24, which can contain both linear and nonlinear processing sections. A circuit 26 receives the signal 12 representative of engine RPM at an input, and produces a "computed load value" output 28, which varies as a function of the rate of change of RPM, as a function of an external load input which may be derived from a physics engine, or as a function of both rate of change of RPM and an external load input. As different loads result in an engine operating at different RPMs, output 28 is effectively a function of load; as such, circuit 26 is referred to herein as a "load gain" circuit. Output 28 is provided to DSP circuit 24. DSP circuit 24 is at least in part controlled by output 28, and thus output waveform 14 is processed with a function that varies with load. The output 30 of DSP circuit 24 is used to provide the sound simulator's audio output; this would typically require the use of a digital-to-analog converter (DAC) (not shown) which converts output 30 to an analog waveform, and a speaker 32. In this way, a sound simulator is provided which produces vehicle engine sounds which vary dynamically with engine load.

Generally, having computed load value output 28 vary with the rate of change of RPM is sufficient to produce an efficient simulation. However, the values derived from a physics engine may be useful in simulating increased load in situations such as a vehicle ascending a steep slope—where RPM may remain constant but the amount of work the engine is performing increases.

The crossfade sample playback engine is preferably arranged such that its stored digital waveforms represent respective RPMs at a given load, with each wave having an associated RPM range with a center RPM value. In a preferred embodiment, no more than two stored waveforms cover a particular RPM range. The playback engine is arranged to receive signal 12 representative of a given RPM value, and to crossfade between the two waveforms covering the range in which the RPM value falls, with the amplitude of each constituent waveform in the output waveform varying with the proximity of the given RPM value to each waveform's center RPM value. The crossfading can be, for example, linear, equal power, or accomplished using some other interpolation technique.

The crossfade sample playback engine described above provides a one-dimensional wave space. The playback engine might alternatively provide a wave space of two or more dimensions. For example, playback engine 10 could contain a second bank 34 of stored digital waveforms (such as waveforms 36 and 38, the frequencies of which also vary with RPM), with each waveform corresponding to a given load range (with load value varying directly with RPM). For a given load, a crossfade is performed between the waveforms which cover that load value. Then, for a given load and RPM, the resulting output waveform 14 can be a mixture of two or more source waves from each wave bank.

Each wave space dimension may be arranged such that more than two waves contribute to each dimension's crossfaded output waveform. Also, additional dimensions could be added, each with a corresponding wave bank, to accommodate other factors which influence a vehicle engine's sound.

The source waves, the playback engine's output waveform, and the output of DSP circuit 30 are preferably digital waveforms; i.e., only the final output to the speaker is analog. However, the digital-to-analog conversion could also be done at other points in the signal flow. For example, the stored digital waveforms could be crossfaded in the digital domain, converted to analog, and processed by an analog voltage-controlled amplifier which is arranged to vary its output with load.

Figure 2:
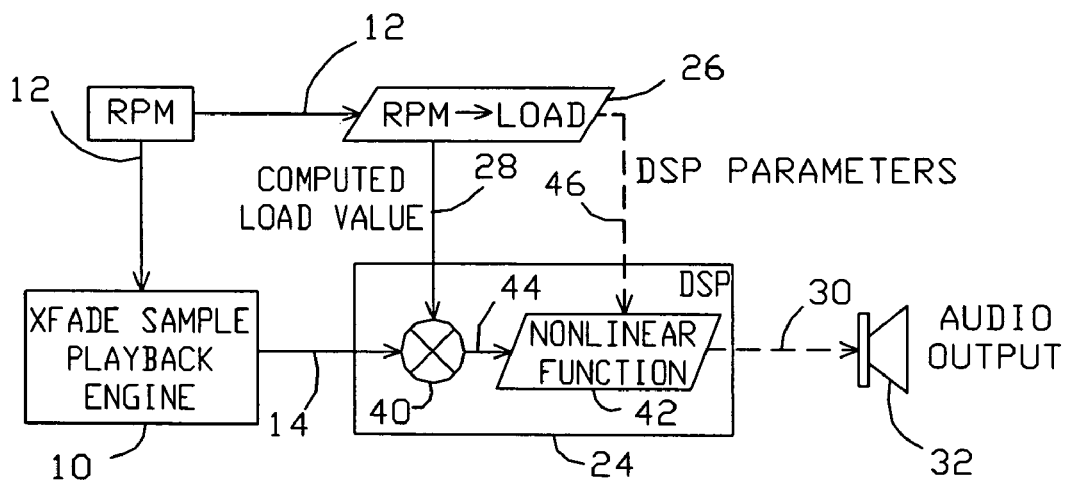
FIG. 2 is a block diagram illustrating one possible embodiment of a vehicle engine sound simulator per the present invention which employs a nonlinear function circuit.

One possible embodiment of a vehicle engine sound simulator per the present invention is shown in FIG. 2. Here, DSP circuit 24 comprises a scaling circuit 40 and a nonlinear function circuit 42. Output 28 produced by load gain circuit 26 is arranged to vary as a function of the computed load value. For example, in one implementation, load gain circuit 26 takes the derivative of RPM and adds an offset to produce output 28. Output waveform 14 and computed load value output 28 are provided to scaling circuit 40, which scales the output waveform in response to the computed load value output.

The scaled output waveform 44 is provided to nonlinear function circuit 42, which adds harmonics to the incoming signal such that, as computed load value output 28 increases, the harmonic content of the nonlinear function circuit's output (30) is altered to simulate the increased harmonic energy heard when an engine is placed under load. This particular implementation of DSP circuit 24 performs best when the nonlinear function provides a predictable increase in harmonic energy with increases in input amplitude.

Nonlinear function circuit 42 might optionally be arranged to receive one or more DSP parameter signals 46 from load gain circuit 26. These signals may also vary as a function of the computed load value, and serve to alter other parameters of the nonlinear function. For example, DSP parameter signals 46 might be used to offset the nonlinear function, or to control crossfading between two or more nonlinear functions.

Figure 3:
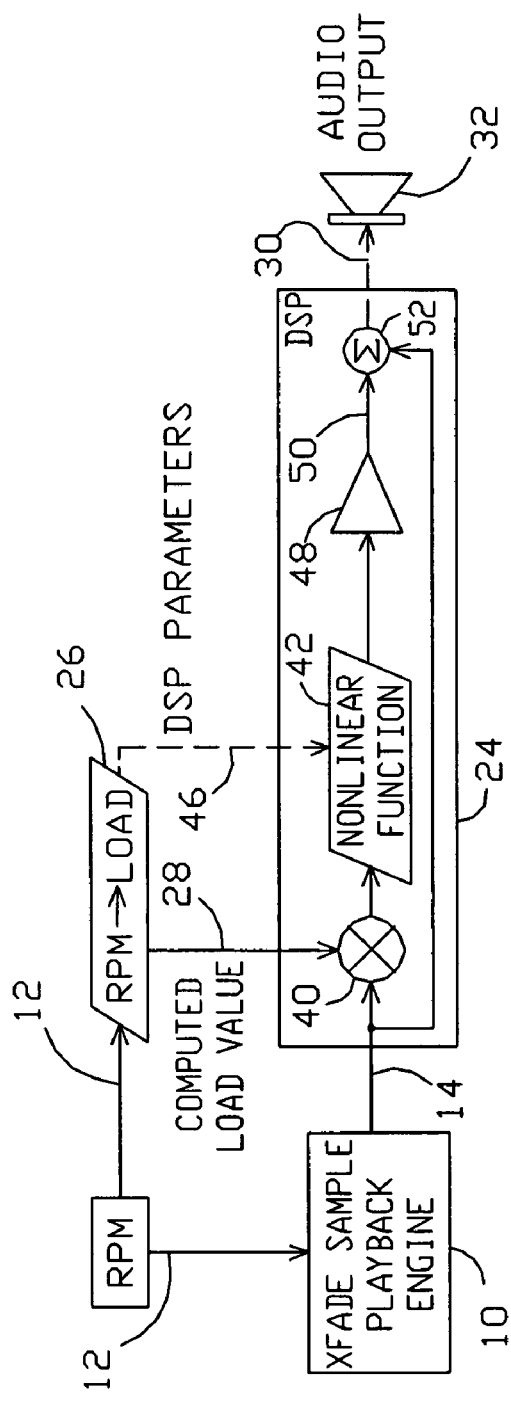
FIG. 3 is a block diagram illustrating another possible embodiment of a vehicle engine sound simulator per the present invention which employs a nonlinear function circuit.

Another possible embodiment is shown in FIG. 3. Here, DSP circuit 24 includes a scaling circuit 40 which scales the playback engine's output waveform 14 with computed load value output 28, and a scaling circuit 48 which scales the output of nonlinear function circuit 42 to produce an output 50. A summation circuit 52 then sums output 50 with the unprocessed output waveform 14 to produce the output 30 of DSP circuit 24. In this embodiment, the scaling provided by scaling circuit 48 is fixed—i.e., it does not vary with RPM—and is used to mix in the desired amount of signal produced by nonlinear function circuit 42. This gives a user the option of mixing in small amounts of nonlinear processed sound, which can result in a more defined output sound.

Figure 4:
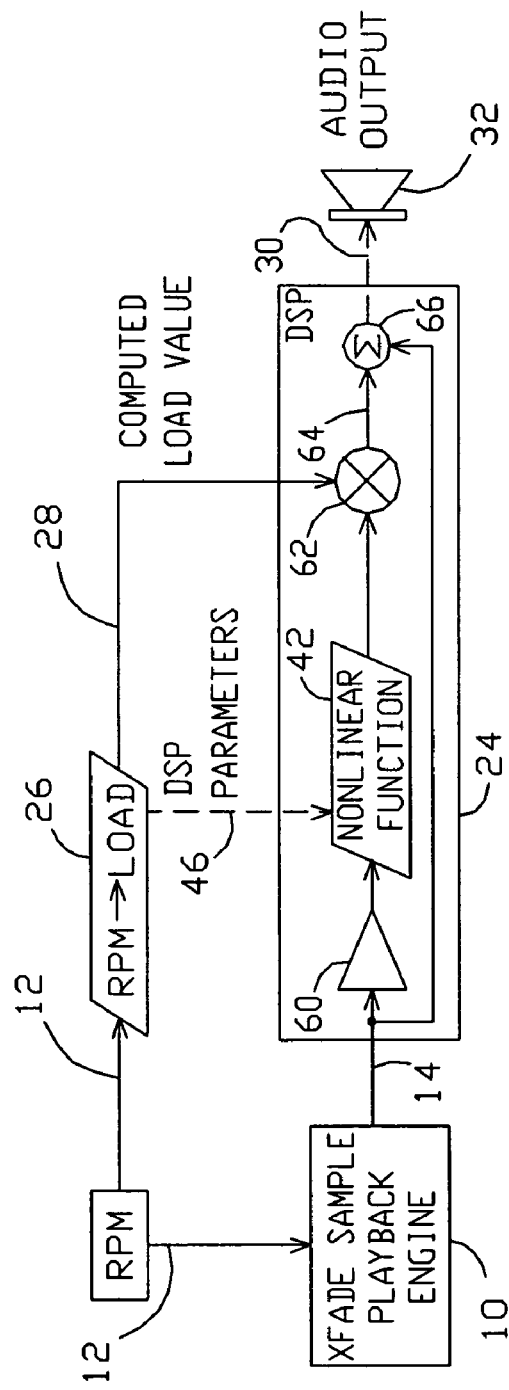
FIG. 4 is a block diagram illustrating another possible embodiment of a vehicle engine sound simulator per the present invention which employs a nonlinear function circuit.

Another possible embodiment is shown in FIG. 4. Here, DSP circuit 24 includes a time-invariant scaling circuit 60 which scales the playback engine's output waveform 14, and a scaling circuit 62 which scales the output of nonlinear function circuit 42 with computed load value output 28 to produce an output 64. A summation circuit 66 then sums output 64 with the unprocessed output waveform 14 to produce the output 30 of DSP circuit 24. This implementation works well with nonlinear functions which do not have a predictable increase in harmonic energy with increases in input amplitude. A fixed scaling value for scaling circuit 60 allows the user to set the harmonic balance that will work best for the desired load sound.

The nonlinear function implemented by nonlinear function circuit 42 is not limited to any particular function. One possible nonlinear function is shown in FIG. 5a, which depicts the input/output transfer function of a clipping function which limits an incoming signal's positive and negative excursions. This function tends to work well with the DSP circuit topologies shown in FIGS. 2-4. One disadvantage of this function is that the sharp transition into clipping can cause audible artifacts, including aliasing, as well as an abrupt onset of distortion as the input signal level changes. However, for many types of input signals, the artifacts are minimal. Generally speaking, increasing the input gain results in an increase in the amplitude of the harmonics in the output signal.

Another possible nonlinear function is shown in FIG. 5b, which depicts an "S"-shaped transfer function that provides a smoother transition into distortion that the hard clipping function shown in FIG. 5a. The function in FIG. 5b can be implemented in a number of ways, including by not limited to:

Polynomial functions of the form: $F(x)=d_0+d_1x+d_2x^2+\ldots+d_Nx^N$; the input signal may need to be limited by a clipping function such as that shown in FIG. 5a to maintain the input signal in a proper range.

Mathematic functions, such as taking the hyperbolic tangent of the input. Again, the input value may need to be limited to a predetermined input range.

Table lookup, where the input value is used as an index to a precalculated table. The table can be calculated by any of the above methods, or can be any arbitrary shape that can be represented with a lookup table.

The function shown in FIG. 5b also works well with the topologies shown in FIGS. 2-4. As the function has a smooth onset of distortion as the input level increases, it is particularly well-suited to topologies that increase the input gain of the function in response to changes in load. Generally speaking, increasing the input gain will result in a smooth increase in the amplitude of the harmonics in the output signal.

An arbitrary non-monotonic, discontinuous nonlinear function which might be used with the present sound simulator is shown in FIG. 5c, which produces a dramatic increase in the output harmonics of an input signal. The function could be implemented, for example, with a lookup table or as a breakpoint function. Here, as input gain increases, the amplitude of any given harmonic will rise and fall in a somewhat unpredictable manner. Therefore, this function is best suited to the topology of FIG. 4, where the input level to the nonlinear function is fixed, and the output of the nonlinear function is multiplied by a time-varying value that is a function of load.

Figures 6, 7A:
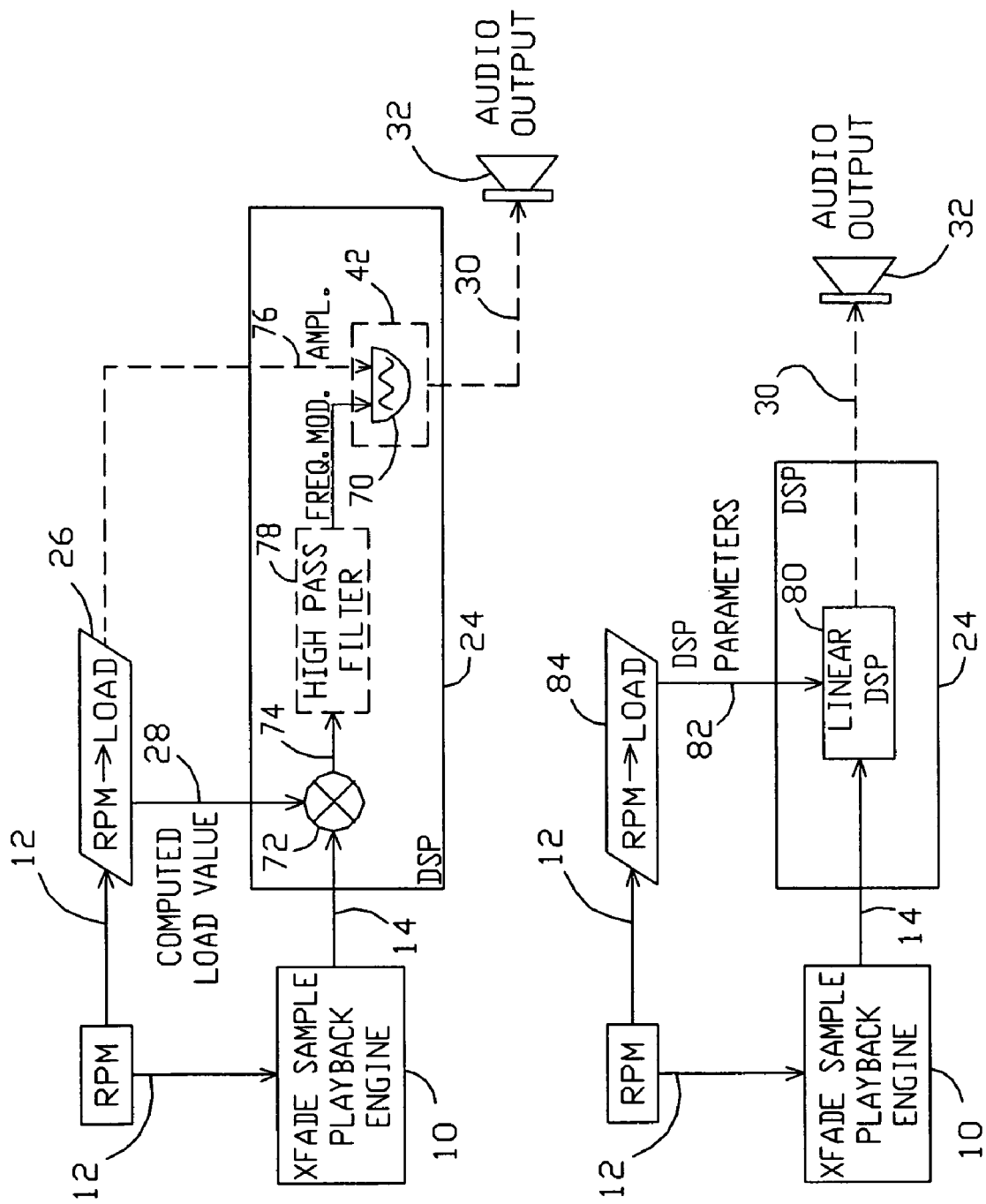
FIG. 6 is a block diagram illustrating an possible embodiment of a vehicle engine sound simulator per the present invention which employs a frequency-modulated sinusoidal oscillator.

Another possible embodiment of the present vehicle engine sound simulator is shown in FIG. 6, in which nonlinear function circuit 42 is in the form of a sinusoidal oscillator 70. DSP circuit 24 includes a scaling circuit 72 which scales the playback engine's output waveform 14 with computed load value output 28; the output 74 of scaling circuit 72 is used as a frequency modulation input for oscillator 70. The amplitude of the oscillator output may be set to a fixed value, or varied in accordance with a signal 76 which varies with load. The output of oscillator 70 will be a waveshaped version of output waveform 14; as computed load value output 28 increases, the amount and amplitude of the harmonics in output signal 30 also increases.

Normally, the base frequency of the oscillator would be set to zero. Setting the base frequency above or below zero produces an output sound which exhibits a warbling or "watery" quality that can be useful for certain types of vehicle sounds. Alternatively, the base frequency might be randomly changed, set to a high fixed frequency, or arranged to vary as a function of RPM.

Note that a frequency-modulated oscillator 70 would be suitable for use as the nonlinear function circuit 42 in each of the sound simulators shown in FIG. 2, 3 or 4.

One disadvantage of the simulator shown in FIG. 6 is that the amplitude of the output harmonics may not rise consistently with output amplitude. This can be remedied by using the frequency-modulated oscillator in a configuration such as that shown in FIG. 4, where the amplitude of frequency-modulation signal 74 is fixed and the oscillator's output amplitude is varied and mixed in with the original signal 14. Another possible solution is to scale output waveform 14 with the computed load value output, and use the result as the phase modulation input to a sinusoidal oscillator. The resulting output signal has a more consistent relationship between increases in input gain and increases in the amplitude of the output harmonics. The amplitude of the modulated oscillator can be fixed, or it can be varied as a function of load.

The simulator shown in FIG. 6 might optionally include a highpass filter 78 interposed between scaling circuit 72 and the frequency modulation input of oscillator 70. This results in the frequency modulation mimicking phase modulation. A simple highpass filter of the form:

$$y(n)=0.5x(n)-0.5x(n\times1)$$

acts as a differentiator, converting the frequency modulation signal into an approximation of phase modulation. An alternative approach would do without the highpass filter, but would employ looped samples that had previously been highpass filtered. This is useful for architectures that have the capability to perform frequency modulation, but are otherwise unable to perform nonlinear functions.

As shown in FIG. 7a, the vehicle engine sound simulator's DSP circuit 24 can also make use of a linear DSP block 80 to process the playback engine's output waveform 14. The linear DSP block 80 receives one or more DSP parameters 82 from a load gain circuit 84, such that one or more parameters of the linear DSP are varied as a function of load. These parameters can include, for example, gain at various frequencies, cutoff frequencies of filters, length of delay lines, or feedback of delay lines. The linear DSP circuit 80 can include one or more DSP blocks in series or parallel, including (but not limited to) delay based DSPs (e.g., comb filters, feedback delay networks, modulated delays), first and second high or low pass filters, allpass filters, resonant filters (e.g., $2^{nd}$ order resonators, coupled-mode filters, or nested allpasses).

Figure 7B:
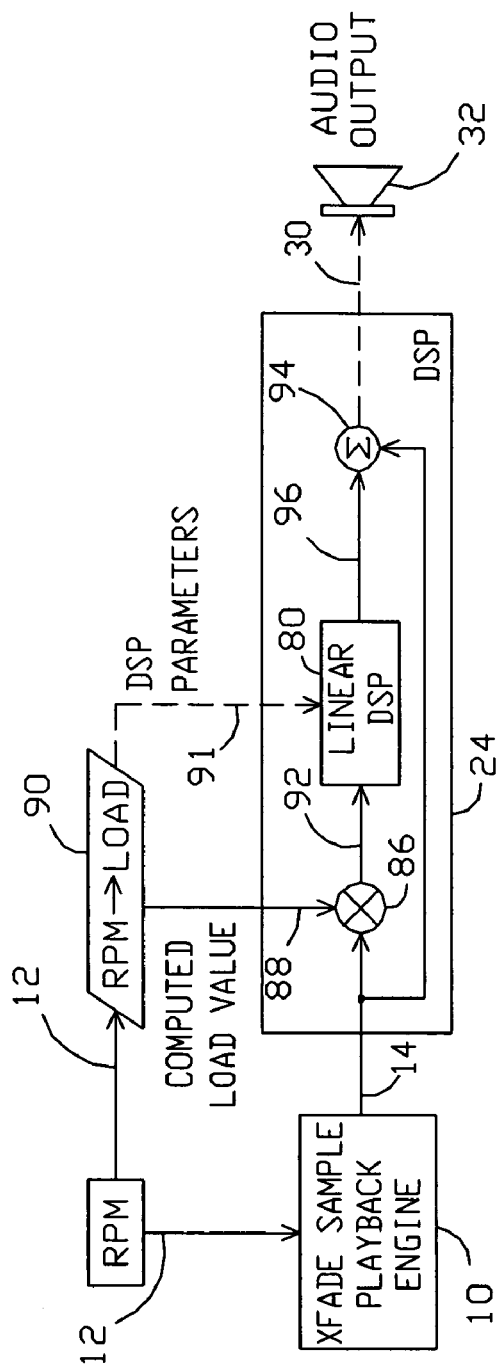
FIG. 7$a$ is a block diagram illustrating one possible embodiment of a vehicle engine sound simulator per the present invention which employs a linear DSP.

One possible embodiment of DSP circuit 24 which employs a linear DSP block 80 is shown in FIG. 7b. The playback engine's output waveform 14 is scaled by a scaling circuit 86 based on a computed load value output 88 received from load gain circuit 90; circuit 90 might also provide one or more DSP parameters 91 to linear DSP block 80. The scaled result (92) is processed by linear DSP block 80. A summation circuit 94 sums the output 96 of linear DSP block 80 with output waveform 14 to produce output 30. This configuration is useful for sound where the amount of filtering needs to vary with load. For example, linear DSP block 80 can contain a first, second, or higher order lowpass filter. The input gain to the linear DSP block will increase with greater values of load, generating the effect of more bass energy in the output signal as load increases. The resulting sound is similar to the increased low frequency energy heard when a large vehicle accelerates.

Figure 7C:
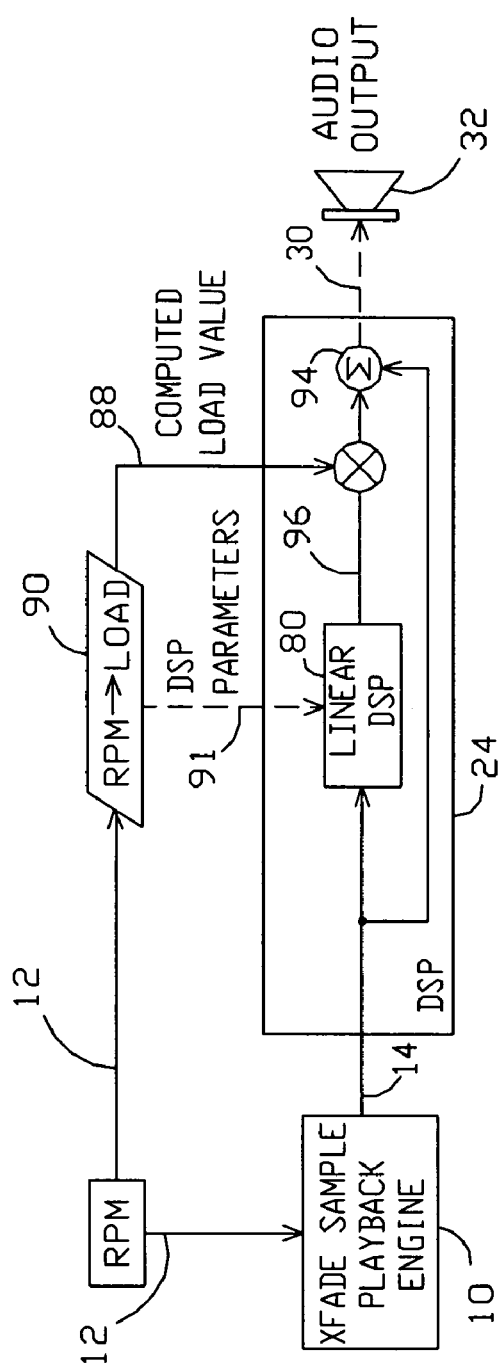

The embodiment shown in FIG. 7c is similar to that shown in FIG. 7b, except that instead of scaling output waveform 14, the output 96 of linear DSP block 80 is scaled by time-varying computed load value output 88. The resulting sound should be nearly identical to that produced by the FIG. 7b configuration.

DSP circuit 24 might also contain both linear and nonlinear DSPs. Two possible embodiments are shown in FIGS. 8a and 8b. In FIG. 8a, the playback engine's output waveform 14 is first processed by a linear DSP 100, scaled with a scaling circuit 102 in response to a computed load value output signal 104 received from a load gain circuit 106, and then processed by a nonlinear function circuit 110. A summing circuit 112 sums the output 114 of nonlinear function circuit 110 and output waveform 14 to produce output 30. In FIG. 8b, the order is reversed: output waveform 14 is first processed by nonlinear function circuit 110, scaled in volume by load, processed by linear DSP 100, and summed with output waveform 14 with summing circuit 112. The signal path shown in FIGS. 8a and 8b can be varied in accordance with the signal flows shown in FIG. 2-4 and FIGS. 7b and 7c. Both the input and output gains can be varied for both the linear and nonlinear blocks. In addition, each DSP block can optionally act upon additional DSP parameters 116 that are calculated as a function of load.

The ordering of the linear and nonlinear DSP blocks has a dramatic impact on the output sound. For example, processing the output of a nonlinear block by several $2^{nd}$ order bandpass filters in parallel results in an output sound where most of the energy is concentrated around the filters' center frequencies. Processing the output of several parallel $2^{nd}$ order bandpass filters with a nonlinear DSP block results in a far different sound, as the resonant frequencies of the filters will interact in the nonlinear DSP block to produce sum and difference frequencies. The first method is useful when precise control over the resonant structure is desired, while the second method is useful in generating metallic engine sounds with a minimum of DSP processing. The filters generate fixed formant frequencies that are characteristic of metal, while the nonlinear process generates harmonics of these formants.

The above-noted series combination can be expanded to provide more control over the sound. For example, the sound can be processed by several bandpass filters to generate formants. The outputs of the bandpass filters are summed, and are processed by a soft clipping process to add harmonics to the signal. The output of the nonlinear function is processed by a lowpass filter to eliminate some of the undesirable higher frequencies. The cutoff frequency of the lowpass filter increases with higher load, to simulate the boost in energy associated with an accelerating vehicle. The diagrams in FIGS. 8a and 8b should be seen as being expandable to any series combination of linear and nonlinear DSP blocks, where the input or output gains of these blocks, or one or more DSP parameters, are being varied as a function of load.

Figure 9:
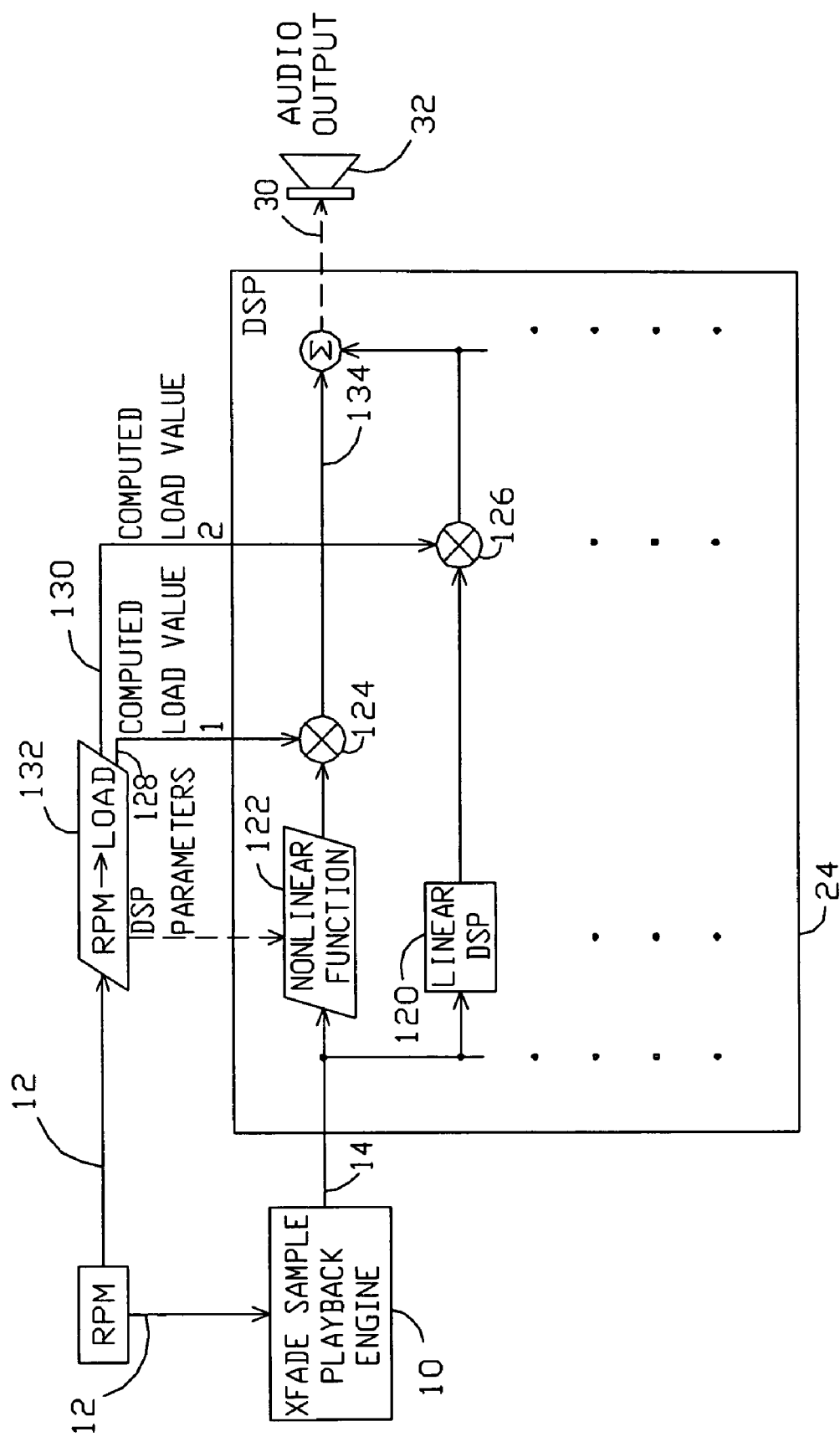
FIG. 9 is a block diagram illustrating one possible embodiment of a vehicle engine sound simulator per the present invention which employs a nonlinear function circuit and a linear DSP in parallel.

Another possible embodiment of a vehicle engine sound simulator per the present invention is shown in FIG. 9. Here, both linear and nonlinear DSP blocks are combined in parallel: the playback engine's output waveform 14 is processed by both a linear DSP block 120 and a nonlinear DSP block 122. The outputs of the DSP blocks are scaled by respective scaling circuits 124, 126, in accordance with respective computed load value outputs 128, 130 received from a load gain circuit 132. A summation circuit 134 sums the scaled outputs to produce output 30. The ordering of the DSP blocks and the scaling circuits can be varied as shown in FIGS. 2-4 and 7b-7c.

The use of parallel DSP blocks is not limited to the embodiment shown in FIG. 9. The number of DSP blocks combined in parallel can vary, according to the needs of the sound desired. For example, some situations may require two nonlinear blocks in parallel with a linear DSP block.

Each parallel branch can include series DSP blocks. For example, a particular algorithm might require 2 parallel branches. The first branch employs several parallel bandpass filters, which are then processed by a nonlinear function such as that shown in FIG. 5c. The second branch might incorporate a lowpass filter, the output of which is processed by a softer nonlinear function such as that shown in FIG. 5b. The computed load value output values could be used to scale the output volumes of both branches, with the first branch being favored for high load situations. The resulting sound will display a sharply metallic ringing under high load situations, and a more mellow engine sound under lower load situations.

The parallel branches can be summed and processed by series DSP blocks, as shown in FIGS. 8a-8b. Similarly, the output of several series-connected DSP blocks could be processed by several parallel DSP branches.

Another possible arrangement is shown in FIG. 10. Here, parallel playback engines 140, 142 are used, with the output of each processed by respective independent DSP blocks 144, 146. The DSP blocks can contain any combination of linear and nonlinear DSPs, in series and/or parallel, as described above. A load gain circuit 148 produces respective sets of parameters 150, 152 which are varied as a function of load; the parameters are sent to the DSP blocks and can be varied as necessary to obtain a desired engine sound.

As an example, one crossfade sample playback engine could contain sinusoidal turbine waves taken from an analysis of a jet sound, and could play back the waves such that the pitch and the crossfading of the waves varies with RPM. The first playback engine's output could be processed by a soft nonlinear function such as that shown in FIG. 5a where the input gain varies with load. A second crossfade sample playback engine could contain recordings of the noise residual taken from an analysis of a jet sound, and could play back the waves such that the waves are at a fixed frequency, and only the crossfading varies with RPM. The second playback engine's output could be processed by a shelving filter, where the lowpass boost gain varies with load. The resulting sound is a very realistic emulation of a jet sound, where higher levels of load result in more turbine harmonics in conjunction with a boost in the lowpass noise frequencies.

The configuration shown in FIG. 10 could be expanded to any number of crossfade sample playback engines, with the outputs of each processed by one or more DSP blocks, where the parameters of the DSP blocks are varied as a function of load.

While particular embodiments of the invention have been shown and described, numerous variations and alternate embodiments will occur to those skilled in the art. Accordingly, it is intended that the invention be limited only in terms of the appended claims.

We claim:

1. A vehicle engine sound simulator, comprising:
   a crossfade sample playback engine which produces an output waveform comprising at least two constituent waveforms which are transposed up and down in frequency as a function of RPM and which are mixed together, the proportions of each constituent waveform in said output waveform varying with an input representative of the RPM of a vehicle engine,
   a load gain circuit which produces a "computed load value" output as a function of the rate of change of said RPM, an external load value, and/or a combination of both, and
   a digital signal processing (DSP) circuit which receives said output waveform from said crossfade sample playback engine and processes said output with a function that varies with said computed load value, the output of said DSP circuit being the output of said vehicle engine sound simulator,
   wherein each of said constituent waveforms is associated with a respective range of RPM values, each of which has a center RPM value, and each RPM range is associated with at least two constituent waveforms, said output waveform crossfaded between the constituent waveforms associated with the range in which a given RPM value falls, the amplitude of each constituent waveform in said output waveform varying with the proximity of said given RPM value to each waveform's center RPM value.

2. The sound simulator of claim 1, wherein each of said constituent waveforms are digital representations of waveforms which are transposed up and down in frequency with RPM.

3. The sound simulator of claim 1, further comprising N wave sets, each of said wave sets comprising a plurality of waveforms which are transposed up and down in frequency with RPM, each of the waveforms in a given wave set varying with a parameter representative of a particular load on a vehicle engine, said crossfade sample playback engine arranged such that said output waveform comprises at least two waveforms from each of said wave sets mixed together, the proportions of each constituent waveform in said output waveform varying with an input representative of the RPM of a vehicle engine and a parameter representative of the load on said vehicle engine.

4. The sound simulator of claim 3, wherein each of said wave sets is associated with a respective range of load values, each of which has a center load value, and each possible load value is associated with two wave sets, said output waveform crossfaded between the two wave sets associated with a given load value.

5. The sound simulator of claim 3, wherein N=2, the waveforms of the first wave set varying with a parameter representative of an unloaded vehicle engine and the waveforms of the second wave set varying with a parameter representative of a loaded vehicle engine, said crossfade sample playback engine arranged such that said output waveform comprises two waveforms from each of said first and second wave sets mixed together.

6. The sound simulator of claim 1, wherein said DSP circuit comprises:
a scaling circuit which receives as inputs said output waveform from said crossfade sample playback engine and said computed load value output from said load gain circuit, and which scales said output waveform based on said computed load value output, and
a nonlinear function circuit which receives said scaled output waveform at an input and which adds harmonics to said scaled output waveform such that the harmonic content of the nonlinear function circuit's output varies with said computed load value output, the output of said nonlinear function circuit being the output of said vehicle engine sound simulator.

7. The sound simulator of claim 6, wherein said load gain circuit is further arranged to produce one or more DSP parameters as a function of said computed load value,
wherein said nonlinear function circuit receives said one or more of said DSP parameters and implements a nonlinear function based on at least one of said one or more DSP parameters.

8. The sound simulator of claim 1, wherein said DSP circuit comprises:
a first scaling circuit which receives as inputs said output waveform from said crossfade sample playback engine and said computed load value output from said load gain circuit, and which scales said output waveform based on said computed load value output,
a nonlinear function circuit which receives said scaled output waveform at an input and which adds harmonics to said scaled output waveform such that the harmonic content of the nonlinear function circuit's output varies with said computed load value output,
a second scaling circuit which scales the output of said nonlinear function circuit by a fixed amount, and
a summation circuit which sums said output waveform from said crossfade sample playback engine with the output of said second scaling circuit, the output of said summation circuit being the output of said vehicle engine sound simulator.

9. The sound simulator of claim 8, wherein said load gain circuit is further arranged to produce one or more DSP parameters as a function of said computed load value,
wherein said nonlinear function circuit receives said one or more of said DSP parameters and implements a nonlinear function based on at least one of said one or more DSP parameters.

10. The sound simulator of claim 1, wherein said DSP circuit comprises:
a first scaling circuit which scales said output waveform from said crossfade sample playback engine by a fixed amount,
a nonlinear function circuit which receives said scaled output waveform at an input and which adds harmonics to said scaled output waveform,
a second scaling circuit which receives as inputs the output of said nonlinear function circuit and said computed load value output from said load gain circuit, and which scales the output of said nonlinear function circuit based on said computed load value output, and
a summation circuit which sums said output waveform from said crossfade sample playback engine with the output of said second scaling circuit, the output of said summation circuit being the output of said vehicle engine sound simulator.

11. The sound simulator of claim 10, wherein said load gain circuit is further arranged to produce one or more DSP parameters as a function of said computed load value,
wherein said nonlinear function circuit receives said one or more of said DSP parameters and implements a nonlinear function based on at least one of said one or more DSP parameters.

12. The sound simulator of claim 1, wherein said DSP circuit comprises a nonlinear function circuit which receives a signal representative of said output waveform at an input and which adds harmonics to said input signal such that the harmonic content of the nonlinear function circuit's output varies with said computed load value output,
wherein said nonlinear function circuit implements a clipping function arranged to add fixed amounts of harmonic energy to said nonlinear function circuit's input signal with increasing load gain as long as said input signal is between predetermined upper and lower limits, and to increase the harmonic energy when said input signal is less than said lower limit or greater than said upper limit.

13. The sound simulator of claim 1, further comprising a load gain circuit which produces a "load gain" output as a function of the rate of change of said RPM, said DSP circuit comprising a nonlinear function circuit which receives a signal representative of said output waveform at an input and which adds harmonics to said input signal such that the harmonic content of the nonlinear function circuit's output varies with said load gain output,
wherein said nonlinear function circuit implements an "S"-shaped transfer function arranged to increase the harmonic energy added to said nonlinear function circuit's input signal with increasing load gain.

14. The sound simulator of claim 13, wherein said "S"-shaped transfer function is implemented with a polynomial function of the form:

$$F(x)=d_0+d_1x+d_2x^2+\ldots+d_Nx^N.$$

15. The sound simulator of claim 1, wherein said DSP circuit comprises a nonlinear function circuit which receives a signal representative of said output waveform at an input and which adds harmonics to said input signal such that the harmonic content of the nonlinear function circuit's output varies with said computed load value output, wherein said nonlinear function circuit implements a nonmonotonic, discontinuous function.

16. The sound simulator of claim 15, wherein said nonlinear function circuit comprises a lookup table which contains sequential values derived from an arbitrary function.

17. The sound simulator of claim 1, wherein said DSP circuit comprises:
 a scaling circuit which receives as inputs said output waveform from said crossfade sample playback engine and said load gain output from said load gain circuit, and which scales said output waveform based on said computed load value output, and
 a nonlinear function circuit which receives said scaled output waveform at an input and which adds harmonics to said scaled output waveform such that the harmonic content of the nonlinear function circuit's output varies with said computed load value output, the output of said nonlinear function circuit being the output of said vehicle engine sound simulator,
 said nonlinear function circuit comprising an oscillator which receives said scaled output waveform at an input and is frequency modulated by said scaled output waveform such that the output of said oscillator is a waveshaped version of said output waveform.

18. The sound simulator of claim 17, wherein the base frequency of said frequency-modulated oscillator is zero.

19. The sound simulator of claim 17, wherein said oscillator is arranged such that the amplitude of its output is fixed.

20. The sound simulator of claim 16, wherein said oscillator is arranged such that the amplitude of its output varies with said computed load value output.

21. The sound simulator of claim 17, further comprising a high pass filter arranged to filter said scaled output waveform prior to its application to said oscillator's frequency modulation input.

22. The sound simulator of claim 21, wherein said highpass filter is of the form:

$$y(n)=0.5x(n)-0.5x(n-1).$$

23. The sound simulator of claim 1, wherein said DSP circuit comprises a linear DSP which receives said one or more DSP parameters and implements a linear function based on at least one of said one or more DSP parameters.

24. The sound simulator of claim 23, wherein said DSP circuit further comprises:
 a scaling circuit which receives as inputs said output waveform from said crossfade sample playback engine and said computed load value output from said load gain circuit, and which scales said output waveform based on said computed load value output, said scaled output waveform applied to said linear DSP, and
 a summation circuit which sums said output waveform from said crossfade sample playback engine with the output of said linear DSP, the output of said summation circuit being the output of said vehicle engine sound simulator.

25. The sound simulator of claim 23, wherein said DSP circuit further comprises:
 a scaling circuit which receives as inputs the output of said linear DSP and said computed load value output from said load gain circuit, and which scales the output of said linear DSP based on said computed load value output, and
 a summation circuit which sums said output waveform from said crossfade sample playback engine with the scaled output of said linear DSP, the output of said summation circuit being the output of said vehicle engine sound simulator.

26. The sound simulator of claim 1, wherein said DSP circuit comprises:
 a linear DSP which receives said output waveform at an input and processes said output waveform with a linear function,
 a scaling circuit which receives as inputs the output of said linear DSP and said computed load value output from said load gain circuit, and which scales said linear DSP's output based on said computed load value output,
 a nonlinear function circuit which receives said scaled output at an input and which adds harmonics to said scaled output such that the harmonic content of the nonlinear function circuit's output varies with said computed load value output, and
 a summation circuit which sums the output waveform from said crossfade sample playback engine with the output of said nonlinear function circuit, the output of said summation circuit being the output of said vehicle engine sound simulator.

27. The sound simulator of claim 26, wherein said load gain circuit further produces one or more DSP parameters as a function of said computed load value, said linear DSP arranged to implement said linear function based on at least one of said one or more DSP parameters and said nonlinear function circuit arranged to implement a nonlinear function based on at least one of said one or more DSP parameters.

28. The sound simulator of claim 1, wherein said DSP circuit comprises:
 a nonlinear function circuit which receives said output waveform from said crossfade sample playback engine and which adds harmonics to said output waveform,
 a scaling circuit which receives as inputs the output of said nonlinear function circuit and said computed load value output from said load gain circuit, and which scales said nonlinear function circuit's output based on said computed load value output, and
 a linear DSP which receives said scaled output at an input and processes said scaled output with a linear function, and
 a summation circuit which sums the output waveform from said crossfade sample playback engine with the output of said linear DSP, the output of said summation circuit being the output of said vehicle engine sound simulator.

29. The sound simulator of claim 28, wherein said load gain circuit further produces one or more DSP parameters as a function of said computed load value, said linear DSP arranged to implement said linear function based on at least one of said one or more DSP parameters and said nonlinear function circuit arranged to implement a nonlinear function based on at least one of said one or more DSP parameters.

30. The sound simulator of claim 1, wherein said load gain circuit produces at least two "computed load value" outputs, said DSP circuit comprising:
 a first branch, comprising:
  a nonlinear function circuit which receives said output waveform from said crossfade sample playback engine and which adds harmonics to said output waveform, and
  a first scaling circuit which receives as inputs the output of said nonlinear function circuit and one of said computed load value outputs from said load gain circuit, and which scales said nonlinear function circuit's output based on said computed load value output, a second branch, comprising:
- a linear DSP which receives said output waveform from said crossfade sample playback engine at an input and processes said scaled output with a linear function, and
- a second scaling circuit which receives as inputs the output of said linear DSP and another of said computed load value outputs from said load gain circuit, and which scales said linear DSP output based on said computed load value output, and
- a summation circuit which sums the outputs of said first and second scaling circuits, the output of said summation circuit being the output of said vehicle engine sound simulator.

31. The sound simulator of claim 30, wherein said load gain circuit further produces one or more DSP parameters as a function of said computed load values, said nonlinear function circuit arranged to implement a nonlinear function based on at least one of said one or more DSP parameters.

32. The sound simulator of claim 30, wherein said DSP circuit further comprises additional branches in parallel with said first and second branches, each of said additional branches comprising series and/or parallel combinations of nonlinear function circuits and linear DSPs, said summation circuit arranged to sum the outputs of all of said branches.

33. The sound simulator of claim 1, further comprising:
- at least one additional crossfade sample playback engine which produces an output waveform comprising at least two constituent waveforms which are transposed up and down in frequency with RPM and which are mixed together, the proportions of each constituent waveform in said output waveform varying with an input representative of the RPM of a vehicle engine,
- additional digital signal processing (DSP) circuits, each of which receives the output waveform of a respective one of said at least one additional crossfade sample playback engines and processes said output with a function that varies with said computed load value, and
- a summation circuit which sums the outputs of each of said DSP circuits, the output of said summation circuit being the output of said vehicle engine sound simulator.

34. The sound simulator of claim 1, further comprising a digital-to-analog converter (DAC) which receives the output of said DSP circuit and converts it to an analog waveform.

35. A vehicle engine sound simulator, comprising:
- at least two crossfade sample playback engines, each of which produces a digitized output waveform comprising at least two constituent digitized waveforms which are transposed up and down in frequency as a function of RPM and which are mixed together, the proportions of each constituent waveform in said output waveform varying with an input representative of the RPM of a vehicle engine,
- a load gain circuit which produces a "computed load value" output as a function of the rate of change of said RPM, an external load value, and/or a combination of both, and
- at least two digital signal processing (DSP) circuits, each of which receives an output waveform from a respective one of said crossfade sample playback engines and processes said output with a function that varies with said computed load value output, and
- a summation circuit which sums the outputs of each of said DSP circuits, the output of said summation circuit being the output of said vehicle engine sound simulator,
- wherein each of said constituent waveforms is associated with a respective range of RPM values, each of which has a center RPM value, and each RPM range is associated with at least two constituent waveforms, each of said digitized output waveforms crossfaded between the constituent waveforms associated with the range in which a given RPM value falls, the amplitude of each constituent waveform in said output waveform varying with the proximity of said given RPM value to each waveform's center RPM value.

* * * * *